Oct. 25, 1932.  C. B. THWING  1,884,388
INITIAL TEAR TESTING APPARATUS
Filed July 16, 1929    5 Sheets-Sheet 5

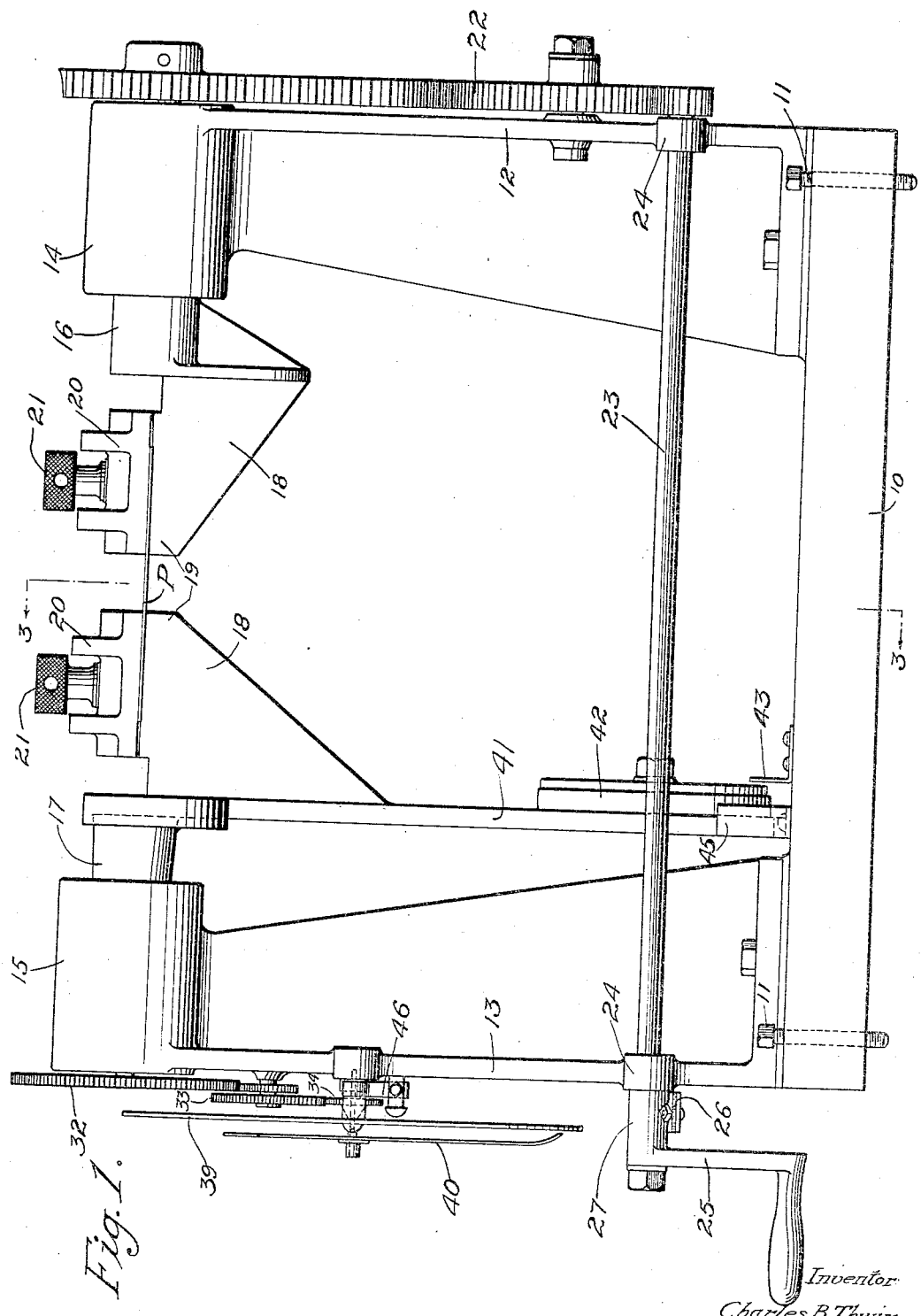

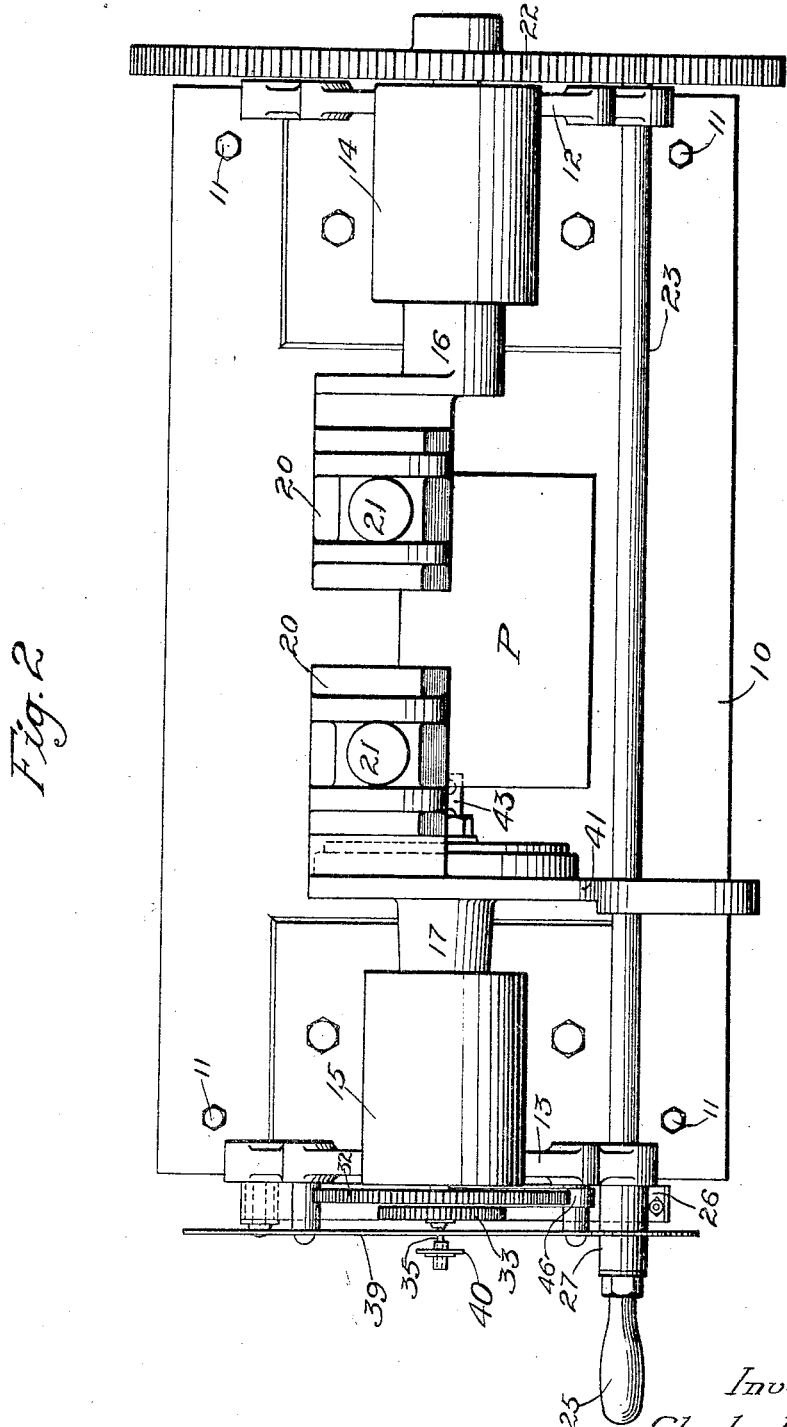

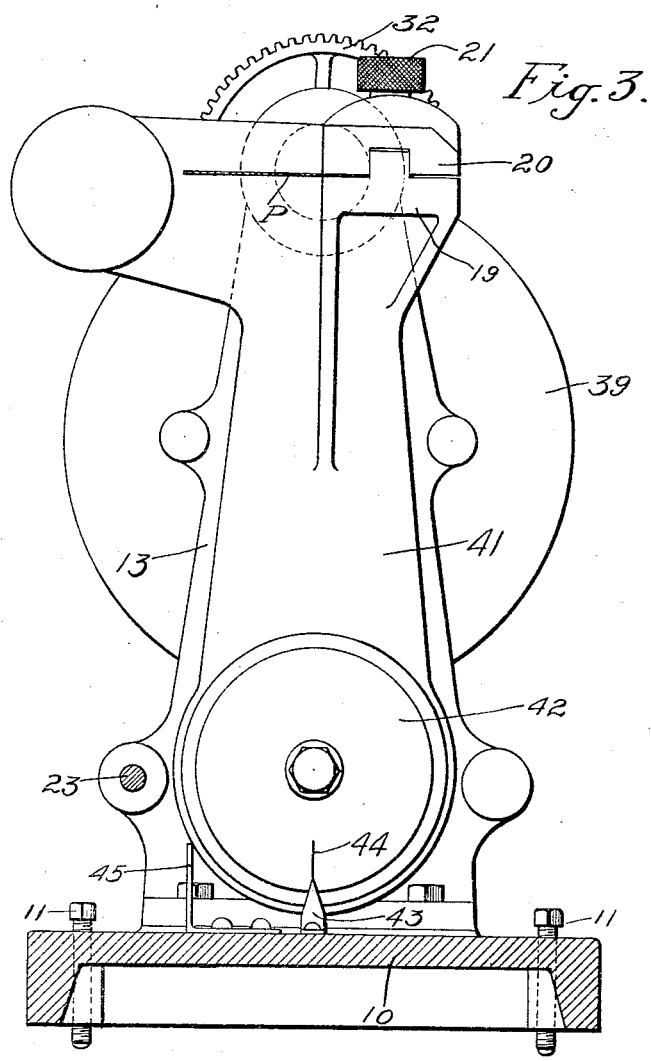

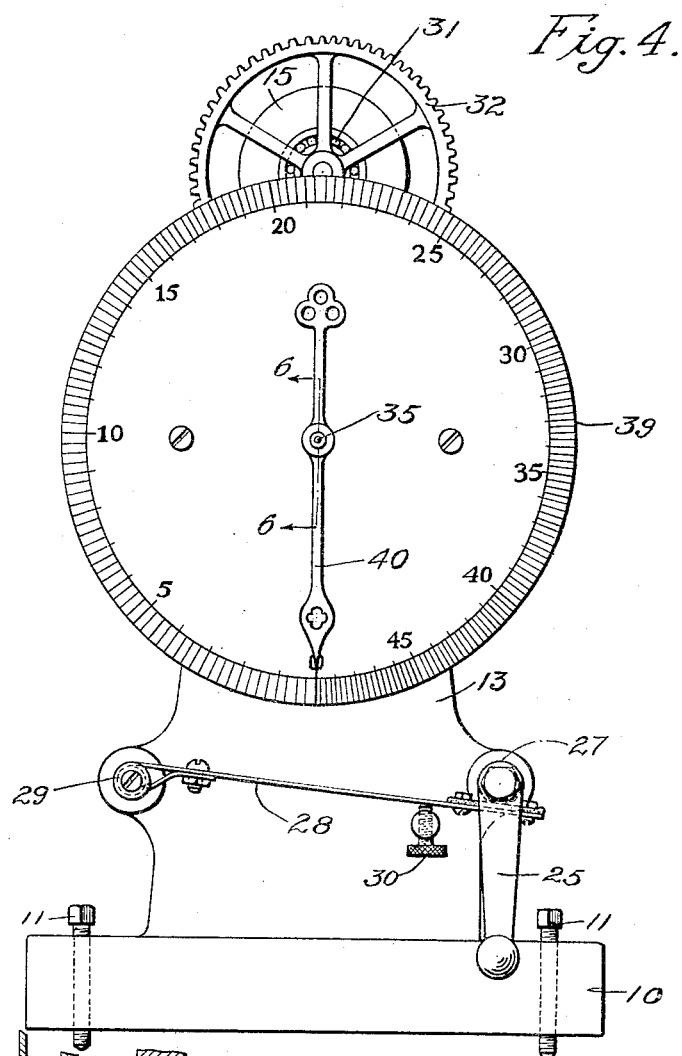
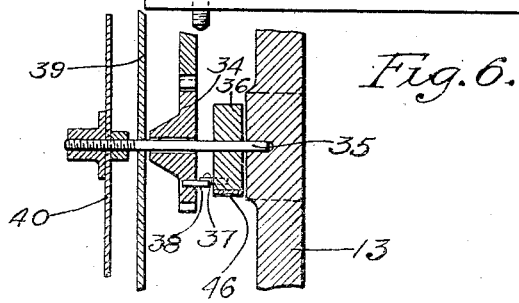

Inventor:—
Charles B. Thwing
by his Attorneys
Howson & Howson

Patented Oct. 25, 1932

1,884,388

UNITED STATES PATENT OFFICE

CHARLES B. THWING, OF PHILADELPHIA, PENNSYLVANIA, ASSIGNOR TO THWING INSTRUMENT COMPANY, OF PHILADELPHIA, PENNSYLVANIA, A CORPORATION OF PENNSYLVANIA

INITIAL TEAR-TESTING APPARATUS

Application filed July 16, 1929. Serial No. 378,691.

This invention relates to tear-testing apparatus and more particularly to an apparatus for testing the initial tear of paper, cardboard or other sheet material.

An important object of the invention is the provision in a construction of this character of an arrangement such that a simple but accurate indication of the torsional strain applied at the moment of initial tear may be provided.

A still further object of the invention is to provide apparatus of this character in which the construction is such that the graduations of a recording scale may be spaced in a manner providing larger spaces at those periods at which initial tear ordinarily occurs so that a much more accurate indication can be had than is usual.

A still further object of the invention is the provision of apparatus of this character in which the indication is maintained after recession of the drive shaft during the tearing operation so that there is no necessity for constant attention to the scale.

A still further object of the invention is the production of apparatus of this character which may be readily and cheaply produced, in which the paper may be readily inserted for the testing operation, and which will be durable and efficient in service.

These and other objects I attain by the construction shown in the accompanying drawings, wherein for the purpose of illustration I have shown a preferred embodiment of my invention and wherein:

Fig. 1 is a side elevation of a tear-testing machine constructed in accordance with my invention;

Fig. 2 is a plan view thereof;

Fig. 3 is a section on line 3—3 of Fig. 1;

Fig. 4 is an end elevation of the machine;

Fig. 6 is a section on line 6—6 of Fig. 4.

Figure 5:
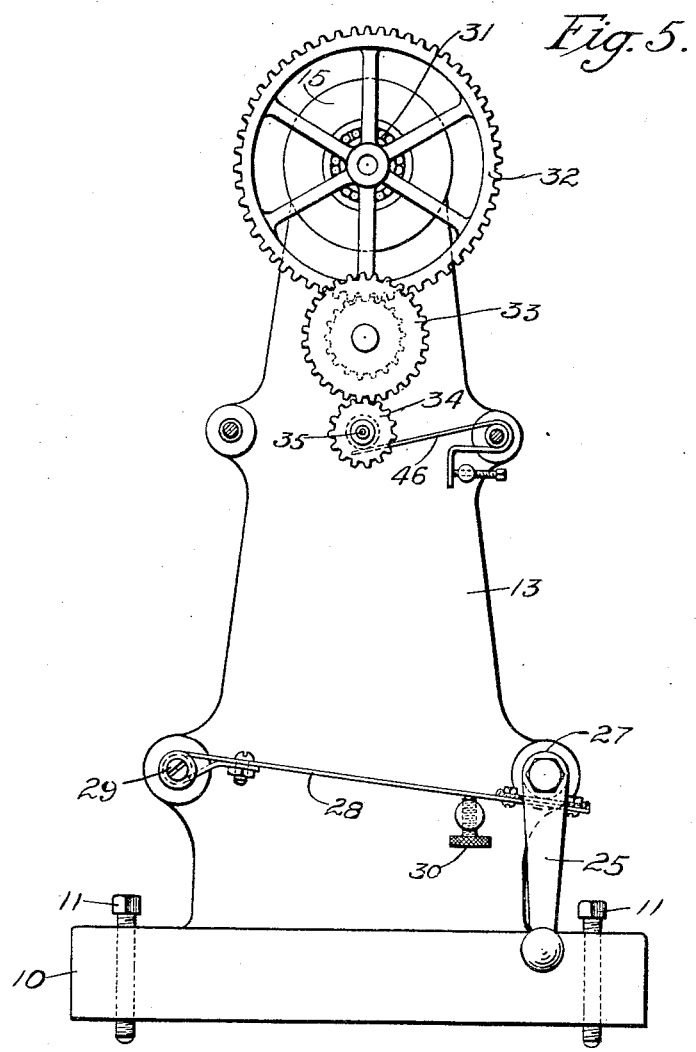
Fig. 5 is an end elevation with the pointer and dial removed.

Referring now more particularly to the drawings, the numeral 10 designates a suitable base supported, for a purpose hereinafter to appear, upon adjustable legs 11. These legs are at present shown as in the form of bolts directed through the base. Arising from this base are opposed standards 12 and 13 having at their upper ends bearings 14 and 15 receiving shafts 16 and 17 respectively. Adjacent ends of shafts 16 and 17 are each provided with a jaw head 18 comprising a fixed jaw 19 rigid to the shaft and a movable jaw element 20 adjustment of which toward the associated fixed jaw element is accomplished by means of a capstan screw 21, or the like. These jaw elements are adapted to receive therebetween a sheet of paper "P" which is to be tested for initial tear.

Means are provided for rotating shaft 16 including a reducing gear train 22 and a shaft 23 which is mounted in bearings 24 carried by the standards and is provided adjacent to the outer face of standard 13 with a crank 25. A friction brake 26 is associated with shaft 23 and more particularly with the hub 27 of the crank handle 25, in order that the action of this shaft may be smooth. This is necessary due to the fact that a jerky operation of shaft 23 would result in sudden strains being placed upon the paper sheet "P" which is tested and these strains would have a tendency to cause tearing in advance of the normal tear and would furthermore be of too limited a duration to enable proper registration thereof upon the dialing mechanism hereinafter described.

In the present instance this brake is illustrated as comprising the arm 28 pivoted upon the outer face of standard 13 as at 29 and having associated therewith adjusting screw 30 by means of which the free end of the arm 28 may be urged toward the hub 27. The face of the free end of the arm co-acting with the hub may have brake material or any other suitable friction material applied thereto.

Shaft 17 is mounted in anti-friction bearings 31 and at its outer end has secured thereto a gear 32 forming a portion of a gear train 33 by means of which rotation is transmitted to an indicator gear 34 which is rotatably mounted upon a shaft 35. Shaft 35 is rotatably mounted in and projects outwardly from the outer face of standard 13 and has secured thereto a disc 36 having an outstanding peg 37 arranged in the path of a similar peg 38 carried by gear 34. The outer end of shaft 35 passes through a dial 39 and is equipped with pointer 40.

It will be obvious that if some means are provided for resisting rotation of shaft 17, with a constantly increasing force, pointer 40 will be moved by rotation of the shaft through the gear train and gear 34 and engagement of pegs 37 and 38 until the paper "P" begins to tear, at which time the forces resisting rotation of shaft 17 will tend to reverse the rotation of this shaft for, as is well known, after initial tear continued tearing requires considerably less force. This reverse rotation of shaft 17 will cause peg 38 to leave peg 37 with the result that pointer 40 will remain in its furthest advanced position and will provide the indication of the poundage with which the paper resisted the tearing strains if dial 39 be properly graduated.

It will also be obvious that ordinary papers upon which tests would be made would nearly all tend to tear at a relatively low poundage and furthermore where the tearing poundage is low it is essntial that a much more accurate record thereof be obtained than is necessary where it is high. Accordingly, in the production of the machine it is essential to practicability that some means be provided which will enable a minutely accurate record of low poundages to be obtained. This might of course be accomplished by varying the extent of movement of pointer 40 through the gear train but this is impractical as the range over which tearing tests must be made is fairly large.

I secure to shaft 17 at the inner end thereof a pendulum 41 and it will be obvious that by employing this pendulum a relatively low weight initially applied to the pendulum will cause a considerable movement thereof, the force with which the pendulum resists rotation increasing with the sine of the angle through which the shaft is rotated. This pendulum has means for securing test weights 42 thereto so that the actual testing capacities of the machine may be considerably varied.

In order to provide for initial setting of the machine I secure to the base 10 pointer 43 co-acting with an index line 44 upon the pendulum and by adjusting screws 11 to vary the angle of base 10 the index line 44 can be brought into proper relation to this pointer. A stop 45 is provided to prevent movement of the pendulum 41 in one direction and to check rotation of the pendulum during return movements after a tearing test.

In use of the apparatus the sheet to be tested is inserted between the jaws of the respective heads, the jaws tightened and shaft 23 rotated. The rotation of shaft 16 thus provided is transmitted through the sheet to the shaft 17 with corresponding movement of the indicator pointer as hereinbefore described. When the tearing point of the sheet is reached and initial tear starts the pendulum is unsupported or its tendency to return rotation will be resisted by a lesser force with the result that pendulum 41 will start its return travel reversing the direction of rotation of shaft 17. Rotation of shaft 35 being suitably frictionally resisted, as for example by friction brake 46, pointer 40 will remain in its furtherest advanced position to provide the desired indication.

As the construction illustrated is obviously but one of many arrangements of the apparatus which is possible, I do not wish to be understood as limiting myself thereto except as hereinafter claimed.

I claim:

1. In a tear-testing machine, opposed axially aligned independently rotatable shafts, means at adjacent ends of said shafts for clamping thereto the ends of a sheet to be torn said clamping means being aligned in the general direction of the axes of the shafts and having their adjacent ends spaced, means for positively rotating one of said shafts, means resisting rotation of the other of said shafts and means for registering rotation of the last-named shaft.

2. In a tear-testing machine, means engaging one end of an edge of a sheet for rotating the same about an axis paralleling said edge of the sheet, means engaging the opposite end of said edge of the sheet for resisting rotation thereof with a force increasing with the angular displacement of the sheet and means for registering the extent through which the sheet is rotated at the moment of initial tear.

3. In a tear-testing machine, normally aligned clamping means adapted to receive opposite ends of an edge of a sheet to be tested, said clamping means being rotatable about an axis substantially paralleling said edge, means for positively rotating one of said clamping means and means resisting rotation of the other of the said clamping means with a force increasing with the angular displacement thereof, the last-named means constantly tending to return the clamping means to its normal position and means for indicating the furthest extent of rotation of the last-named clamping means.

4. In a tear-testing machine, opposed standards, shafts rotatable therein, clamping heads carried by adjacent ends of said shafts and disposed in end to end relation, said clamping heads having their adjacent ends spaced, means for positively rotating one of the shafts, a pendulum secured to the other of the shafts and means for indicating angular displacement of the pendulum.

5. In a tear-testing machine, rotatable clamping means arranged in aligned end to end relation and adapted to engage opposite ends of an edge of a sheet to be tested, means for rotating one of said clamping means about an axis paralleling said edge of the sheet, means normally maintaining the other of the clamping means in a predetermined position and resisting movement of the last-named clamping means from said position with a force increasing with the sine of the angle through which it is rotated and an indicator means operatively connected with the last-named clamping means and registering the extent of movement of the last-named clamping means from its normal position.

6. In a tear-testing machine, opposed standards, shafts rotatable therein, clamping heads carried by adjacent ends of the shafts, means for positively rotating one of said shafts, a pendulum secured to the other of the shafts, an indicator, means positively connecting the pendulum shaft and the indicator during movement of the pendulum shaft from a normal position and disconnecting said shaft and indicator during return movement of the shaft and means for frictionally resisting rotation of the indicator.

7. A device as claimed in claim 6 wherein the means for rotating the first-named shaft include a third shaft, and means are provided for frictionally resisting rotation of the third shaft.

CHARLES B. THWING.